US009969312B2

(12) United States Patent
Stiver

(10) Patent No.: US 9,969,312 B2
(45) Date of Patent: May 15, 2018

(54) CONTAINER HOLDER FOR MOTOR VEHICLE

(71) Applicant: Honda Motor Co., Ltd., Tokyo (JP)

(72) Inventor: Brendan Christopher Stiver, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 15/271,517

(22) Filed: Sep. 21, 2016

(65) Prior Publication Data

US 2018/0079343 A1 Mar. 22, 2018

(51) Int. Cl.
*B60N 3/10* (2006.01)
*B60R 11/00* (2006.01)

(52) U.S. Cl.
CPC .............. *B60N 3/102* (2013.01); *B60R 11/00* (2013.01); *B60R 2011/0082* (2013.01); *Y10S 224/926* (2013.01)

(58) Field of Classification Search
CPC ..... B60N 3/102; Y10S 224/926; B60R 11/00; B60R 2011/0082
USPC ...................... 224/926, 549; 248/311.2, 150; 297/188.15, 188.16
See application file for complete search history.

(56) References Cited

U.S. PATENT DOCUMENTS 4,728,018 A * 3/1988 Parker .................... B60N 3/102 224/544
4,733,908 A * 3/1988 Dykstra ................. B60N 3/102 248/311.2
4,948,080 A * 8/1990 Jack ......................... B62J 11/00 224/414
5,154,380 A * 10/1992 Risca ................. A47G 23/0216 248/154
5,282,592 A * 2/1994 Ma ...................... A47G 23/0216 220/495
5,398,898 A * 3/1995 Bever ................ A47G 23/0225 248/154
5,533,700 A * 7/1996 Porter .................... B60N 3/101 224/926
5,618,018 A * 4/1997 Baniak ................... B60N 3/102 224/483

(Continued)

FOREIGN PATENT DOCUMENTS

| CN | 2796576 | 7/2006 |
|---|---|---|
| EP | 1117561 | 7/2001 |

(Continued)

OTHER PUBLICATIONS

A vacuum-suction-based cupholder for a BMW interior, May 2004 http://cargocollective.com/songnos/vacuum-cupholder.

*Primary Examiner* — Justin Larson

(74) *Attorney, Agent, or Firm* — Honda Patents & Technologies North America, LLC; Clifford B Vaterlaus

(57) ABSTRACT

A container holder for a motor vehicle is disclosed. The container holder includes a housing for coupling to the motor vehicle. The container holder further includes a cover pivotally coupled to the housing. The cover is configured to pivot from a retracted position to a raised position. The container holder further includes a plurality of arms coupled to the cover and connected at a central hinge. The plurality of arms is configured to swivel about the central hinge from a closed position to an open position to define a cavity. The cavity is configured to receive a container.

20 Claims, 6 Drawing Sheets

300 108 114 100 104 290 244 106 146 246 302
114 116 100 136 172 104 106 304
114 126 100 116 104 106 306

(56) References Cited

U.S. PATENT DOCUMENTS 5,697,593 A * 12/1997 Bieck ..................... B60N 3/102 224/282
5,743,504 A * 4/1998 Miller .................... B60N 3/103 224/42.38
D417,125 S * 11/1999 Miller ............................ D7/601
6,024,395 A * 2/2000 Kang ..................... B60N 3/102 296/37.1
6,095,471 A * 8/2000 Huang ................... B60N 3/102 224/400
D431,423 S * 10/2000 Ohm .............................. D7/620
6,349,913 B1 * 2/2002 Jankowski ............. B60N 3/102 224/281
6,409,061 B1 * 6/2002 Fischer .................. B60N 3/102 224/281
6,439,525 B1 * 8/2002 Gehring ............... B60N 2/4686 224/926
6,530,549 B2 * 3/2003 Schaal ................... B60N 3/102 224/549
6,550,736 B2 * 4/2003 Schaal ................... B60N 3/102 224/281
6,705,580 B1 3/2004 Bain
6,712,325 B2 * 3/2004 Choi ...................... B60N 3/102 224/926
6,830,276 B2 * 12/2004 Johansson, Sr. ..... B60N 2/4686 224/926
7,121,517 B2 * 10/2006 Oana ...................... B60N 3/102 248/311.2
7,641,252 B2 * 1/2010 Sturt ...................... B60N 2/468 296/24.34
7,648,114 B2 * 1/2010 Åkerstedt .............. B60N 3/102 248/313
9,120,401 B2 * 9/2015 Brinas .................... B60N 3/102
9,585,505 B2 * 3/2017 Meline ............... A47G 23/0208
2002/0096531 A1 * 7/2002 Schaal ................... B60N 3/102 220/737

FOREIGN PATENT DOCUMENTS

KR 200174736 5/2000
KR 200174738 5/2000
KR 20060057906 5/2006

* cited by examiner

CONTAINER HOLDER FOR MOTOR VEHICLE

TECHNICAL FIELD

The present disclosure relates to a motor vehicle, and more particularly to a container holder for the motor vehicle.

BACKGROUND

Motor vehicles, such as passenger cars, have holders disposed in a console panel for holding beverage containers. The holders are generally disposed in an upright position to receive the container. The location and position of holders in the console panel may occupy a lot of space in and around the console panel. Further, the holders may not be easily stowed away when the holders are not in use. Some known holders are designed to stay in an upright position when in use, and in a folded position when not in use. However, design of such known holders is complex, which in turn makes the manufacturing and development of the holders expensive, time consuming and tedious.

SUMMARY OF THE DISCLOSURE

In one aspect of the present disclosure, a container holder for a motor vehicle is provided. The container holder includes a housing for coupling to the motor vehicle. The container holder further includes a cover pivotally coupled to the housing. The cover is configured to pivot from a retracted position to a raised position. The container holder further includes a plurality of arms coupled to the cover and connected at a central hinge. The plurality of arms is configured to swivel about the central hinge from a closed position to an open position to define a cavity. The cavity is configured to receive a container.

In another aspect of the present disclosure, a container holder for a motor vehicle is provided. The container holder includes a cover and a plurality of arms coupled to the cover and connected at a central hinge. The plurality of arms is configured to swivel about the central hinge from a closed position to an open position to define a cavity. In the closed position, the plurality of arms is positioned side by side. In the open position, the plurality of arms is positioned at an angular offset about the central hinge. The cavity is configured to receive a container.

In yet another aspect of the present disclosure, a container holder for a motor vehicle is provided. The container holder includes a housing for coupling to a console panel of the motor vehicle. The container holder further includes an L-shaped cover pivotally coupled to the housing. The L-shaped cover is configured to pivot from a retracted position to a raised position. The container holder further includes a plurality of L-shaped arms coupled to the L-shaped cover and connected at a central hinge. The plurality of L-shaped arms is configured to swivel about the central hinge from a closed position to an open position to define a cavity. The cavity is configured to receive a container.

Other features and aspects of this disclosure will be apparent from the following description and the accompanying drawings.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

Figure 1:
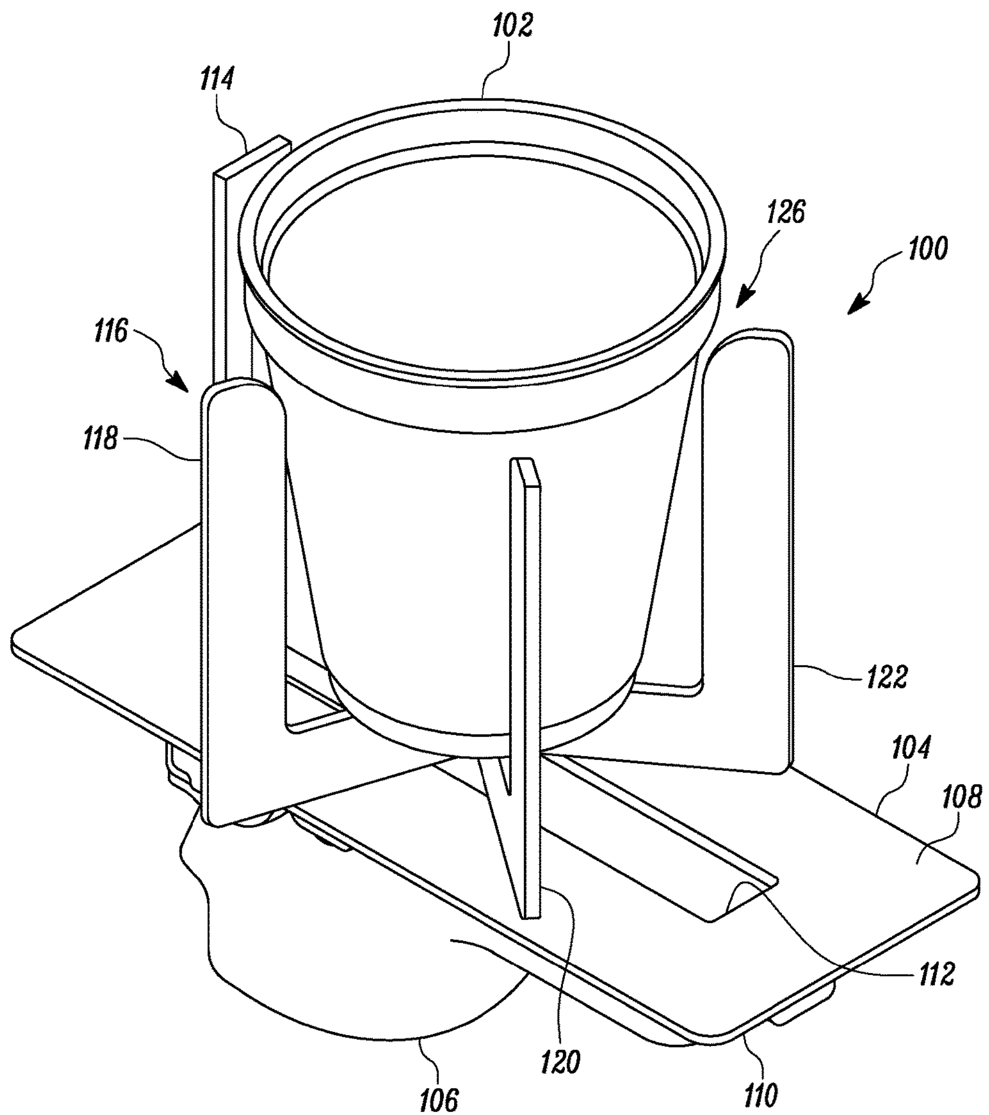
FIG. 1 is a perspective view of a container holder disposed on a console panel of a motor vehicle.

Referring to FIG. 1, a container holder 100 having a container 102 disposed therein, according to an embodiment of the present disclosure, is illustrated. In one embodiment, the container holder 100 is implemented in a motor vehicle. The container holder 100 is configured to hold the container 102, such as a cup or a mug used for carrying hot or cold beverages, a water bottle, and any other objects used for carrying eatables or drinks. In an embodiment, the motor vehicle may include vehicles, such as passenger cars, trucks, buses or any other vehicles known in the art. The motor vehicle includes a console panel 104 disposed within or around an operator area or a driver compartment of the motor vehicle. In passenger cars, a central panel is disposed between a driver seat and a front passenger seat. The central panel may be configured to support various components including, but not limited to, a hand brake lever and a gear shift lever. Further, multiple pockets may be defined in the central panel to receive mobile devices, mobile chargers, and various accessory items therein. A central panel may also be defined near passenger seats. The passenger car also includes side panels defined in front doors and rear doors to define multiple pockets to receive bottles and cups. Accordingly, it may be understood that the container holder 100 may be disposed or mounted on the central panels or the side panels of the passenger car. Furthermore, the container holder 100 may be disposed at any location within arm's reach of the driver or a passenger. In some embodiments, the container holder 100 may be disposed within arm's reach of any occupant of the motor vehicle, including rear seat passengers. Although the container holder 100 is designed to hold the container 102 for carrying eatables or drinks, the container holder 100 may also be used for carrying any other items that the driver or the passenger thinks may fit within the container holder 100. For description purpose of the present disclosure, the central panels, the side panels, or any surfaces within the operator area or the driver compartment, which can support the container holder 100, are herein referred to as "the console panel 104."

The container holder 100 includes a housing 106 coupled to the console panel 104 of the motor vehicle. The housing 106 is configured to receive and support various components of the container holder 100, which is discussed in detail hereinbelow. The console panel 104 includes an upper surface 108 and a lower surface 110 distal to the upper surface 108. The console panel 104 further includes an opening 112 extending between the upper surface 108 and the lower surface 110. The housing 106 is coupled to the lower surface 110 of the console panel 104 such that the housing 106 is accessed from top of the console panel 104 through the opening 112. In one embodiment, the opening 112 has a rectangular shape having a length and a width. In other embodiments, the opening 112 may have an elliptical shape, a square shape, or a polygonal shape.

The container holder 100 further includes a cover 114 pivotally coupled to the housing 106. The cover 114 is configured to pivot from a retracted position (step 302 shown in FIG. 6) to a raised position (step 304 shown in FIG. 6). The container holder 100 further includes a plurality of arms 116 coupled to the cover 114. In the raised position, the cover 114 and the plurality of arms 116 are disposed in an upright position above the console panel 104. In the present embodiment, the plurality of arms 116 includes a first arm 118, a second arm 120, a third arm 122, and a fourth arm 124 (shown in FIG. 2). Each of the plurality of arms 116 is configured to swivel relative to the cover 114 from a closed position (step 304 shown in FIG. 6), in which the plurality of arms 116 is positioned side by side, to an open position (step 306 shown in FIG. 6), in which the plurality of arms 116 is angularly offset, to define a cavity 126. The cavity 126 is configured to receive the container 102. In some embodiments, each of the plurality of arms 116 is disposed equidistant from each other to define the cavity 126 having a circular periphery. A height and a cross sectional area of the cavity 126 are defined based on a construction and a structure of the cover 114 and the plurality of arms 116, which will be described in detail herein below.

Figure 2:
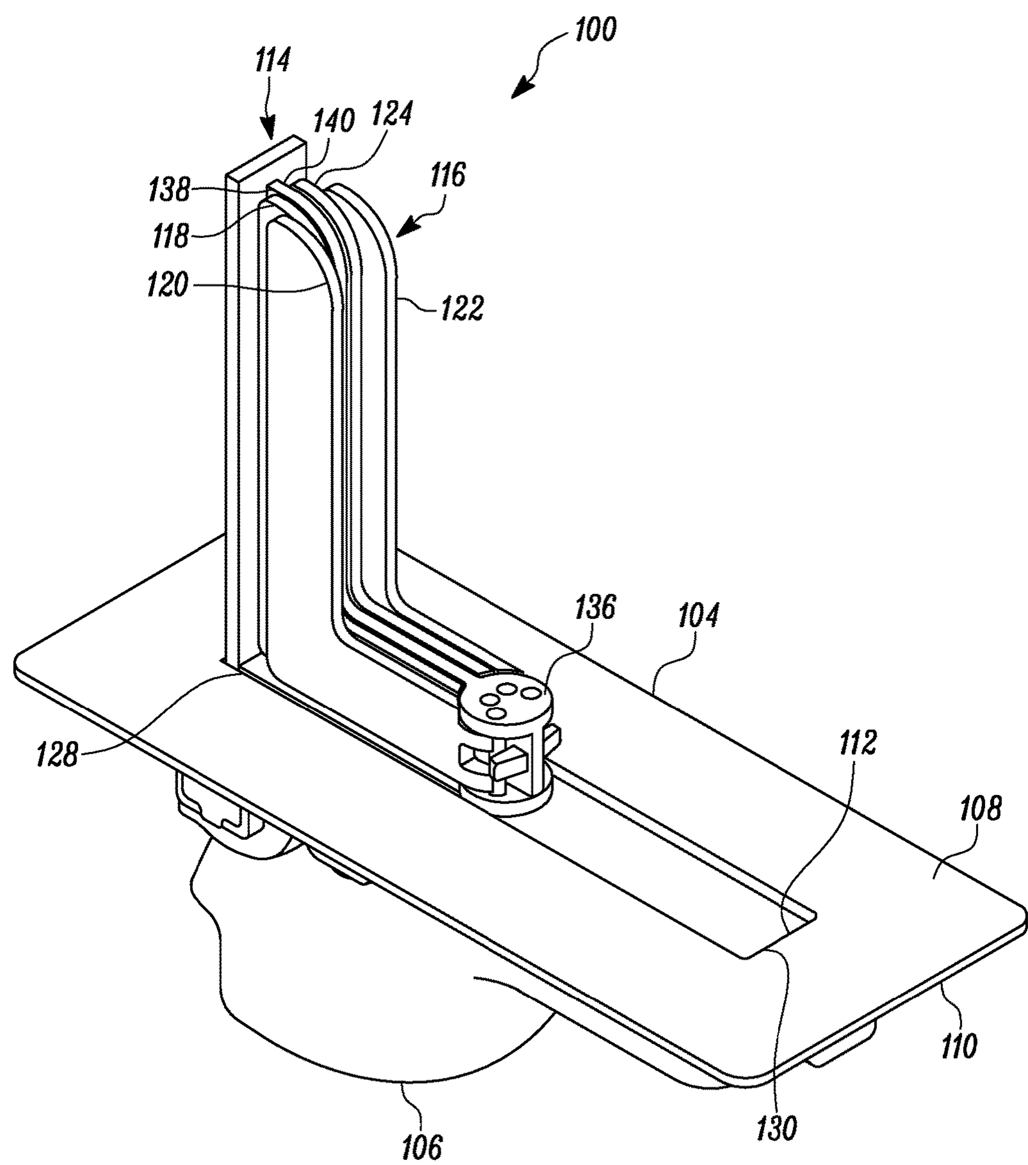
FIG. 2 is a perspective view of the container holder having a cover and a plurality of arms stacked up with the cover.

Referring to FIG. 2, the raised position of the cover 114 along with the plurality of arms 116 of the container holder 100, according to an embodiment of the present disclosure, is illustrated. In the raised position, the cover 114 is positioned perpendicular to the upper surface 108 of the console panel 104 and aligned within the opening 112. In another embodiment, the cover 114 may be positioned at any angle with respect to the upper surface 108 of the console panel 104. The opening 112 includes a first end 128 and a second end 130 distal to the first end 128. The cover 114 is pivotally coupled at the first end 128 of the opening 112. Each of the plurality of arms 116 is coupled to the cover 114 and connected at a central hinge 136 of the cover 114. In the raised position, the first arm 118 and the second arm 120 are stacked and disposed adjacent to a first side 138 of the cover 114 and the third arm 122 and the fourth arm 124 are stacked and disposed adjacent to a second side 140 that is opposite to the first side 138 of the cover 114. Thus, each of the plurality of arms 116 is stacked and disposed proximal to the cover 114 in the closed position of the plurality of arms 116. In certain embodiments, the first and second arms 118, 120 swivel about the central hinge 136 in a counter clockwise direction relative to the cover 114 and the third and fourth arms 122, 124 swivel about the central hinge 136 in a clockwise direction relative to the cover 114 to define the cavity 126.

Figure 3:
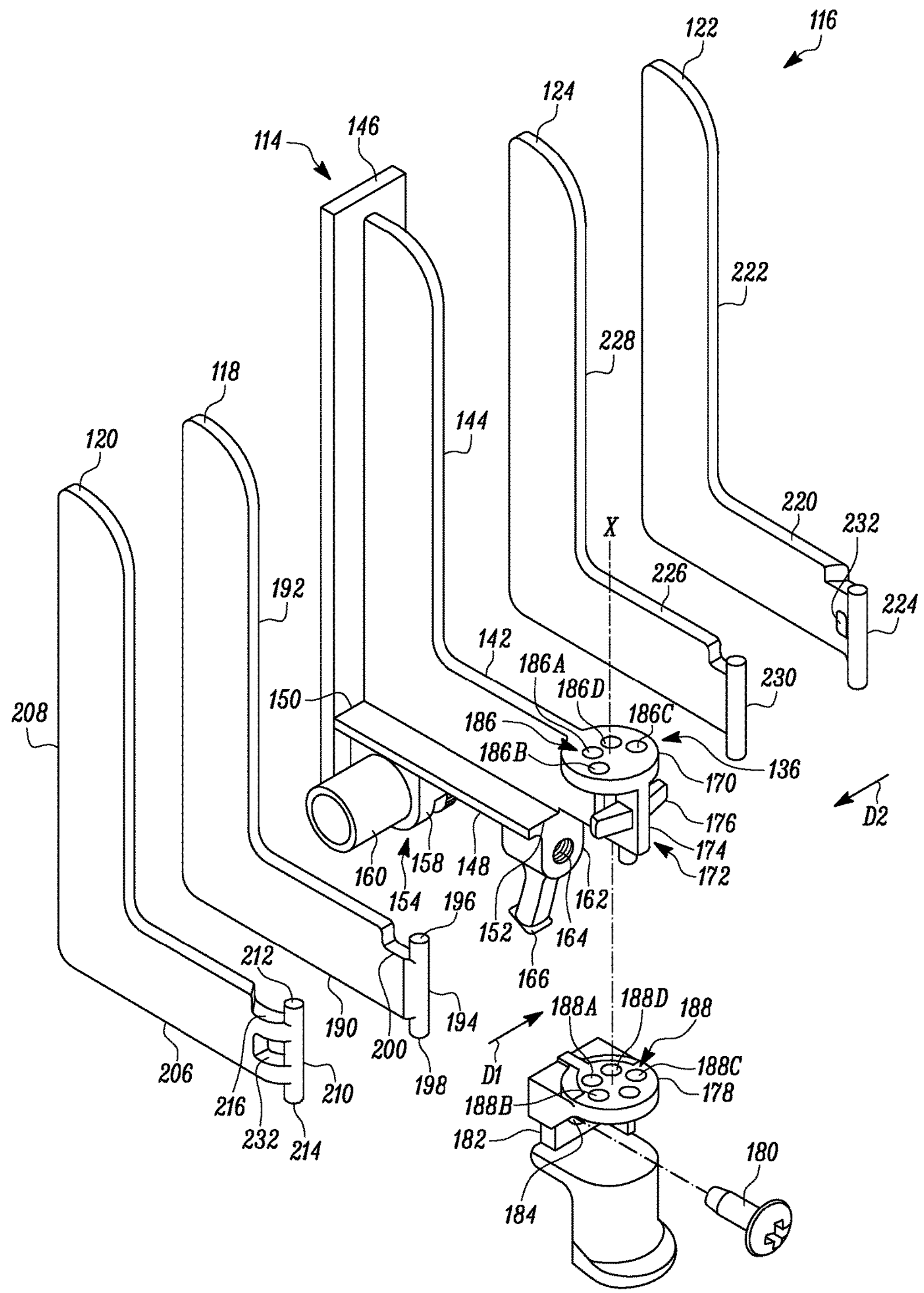
FIG. 3 is an exploded view showing coupling of the cover and the plurality of arms.

Referring to FIG. 3, coupling of the plurality of arms 116 with the cover 114, according to an embodiment of the present disclosure, is illustrated. The cover 114 includes a horizontal portion 142 and a vertical portion 144 extending from the horizontal portion 142. In one embodiment, the vertical portion 144 is perpendicular to the horizontal portion 142. More specifically, the vertical portion 144 is disposed at 90 degrees with respect to the horizontal portion 142. In some embodiments, an angle of inclination between the horizontal portion 142 and the vertical portion 144 may be greater than 90 degrees. Further, the horizontal portion 142 and the vertical portion 144 may be made from materials, such as metals or metal alloys including steel and aluminum, and polymers including, but not limited to, plastics and silicone rubber.

The cover 114 further includes a cover plate 146 attached to the vertical portion 144. The cover plate 146 is attached to the vertical portion 144 in such a manner that the cover plate 146 closes the opening 112 defined in the console panel 104 in the retracted position of the cover 114. The cover plate 146 has a rectangular shape complementary to the rectangular shape of the opening 112. In various embodiments, the cover 114 may have a shape complementary to a corresponding shape of the opening 112 such that the opening 112 is closed in the retracted position of the cover 114. In one embodiment, the cover plate 146 may be made from a material similar to a material of the console panel 104. In another embodiment, the material of the cover plate 146 may be different from the material of the console panel 104. In yet another embodiment, the cover plate 146 may be made from a material similar to a material of the vertical portion 144.

The cover 114 further includes a bottom cover plate 148 attached to the horizontal portion 142. The bottom cover plate 148 has a first end 150 attached to the cover plate 146 and a second end 152 distal to the first end 150. The cover 114 further includes a pivot member 154 disposed at the first end 150 of the bottom cover plate 148. The pivot member 154 includes a first mounting portion 158 for attaching a hollow shaft 160 of the container holder 100 with the bottom cover plate 148. A portion of the hollow shaft 160 extends radially outward from the first mounting portion 158. The cover 114 further includes a second mounting portion 162 attached to the second end 152 of the bottom cover plate 148. The second mounting portion 162 further includes a threaded hole 164 and an extending portion 166 extending vertically downward from the second mounting portion 162. Although the pivot member 154 and the second mounting portion 162 are attached to the bottom cover plate 148 in the present embodiment, it may be understood that the pivot member 154 and the second mounting portion 162 may be directly attached to the horizontal portion 142 of the cover 114.

The central hinge 136 includes a top plate 170 attached to the horizontal portion 142 of the cover 114. The central hinge 136 further includes a snapping member 172 coupled to the cover 114. More specifically, the snapping member 172 is attached to the top plate 170 of the central hinge 136. The snapping member 172 includes a vertical extension 174 extending downward from the top plate 170 and a transverse extension 176 extending radially outward from the vertical extension 174. In one embodiment, the snapping member 172 may be integrally formed with the top plate 170. In another embodiment, the snapping member 172 may be an individual component fastened to at least one of the top plate 170 of the central hinge 136 and the horizontal portion 142 of the cover 114. The snapping member 172 is configured to hold the plurality of arms 116 approximately equidistant from each other to define the cavity 126. More specifically, the snapping member 172 is configured to hold each of the plurality of arms 116 about the central hinge 136 at an angular offset. The central hinge 136 further includes a bottom plate 178 disposed below the top plate 170 and attached to the horizontal portion 142 of the cover 114 using a fastening member 180. More specifically, the bottom plate 178 includes a downward extension 182 having a through hole 184. During assembly of the central hinge 136, the through hole 184 of the downward extension 182 of the bottom plate 178 is aligned with the threaded hole 164 of the second mounting portion 162. Further, the fastening member 180 is inserted via the through hole 184 and engaged with the threaded hole 164 of the second mounting portion 162.

The top plate 170 further includes a plurality of holes 186 disposed around a central axis "X" of the central hinge 136. More specifically, the top plate 170 includes a first hole 186A, a second hole 186B, and a third hole 186C, and a fourth hole 186D corresponding to the first, second, third and fourth arms 118, 120, 122, 124. Similarly, the bottom plate 178 further includes a plurality of holes 188 disposed around the central axis "X". More specifically, the bottom plate 178 includes a first hole 188A, a second hole 188B, a third hole 188C, and a fourth hole 188D corresponding to the first, second, third and fourth arms 118, 120, 122, 124. Further, each of the plurality of holes 186 of the top plate 170 is coaxial to each of the plurality of holes 186 of the bottom plate 178. The plurality of holes 186 of the top plate 170 and the plurality of holes 188 of the bottom plate 178 are together configured to pivotally couple the plurality of arms 116 with the cover 114.

The first arm 118 of the container holder 100 includes a first horizontal portion 190 and a first vertical portion 192 extending from the first horizontal portion 190. In one embodiment, the first vertical portion 192 is perpendicular to the first horizontal portion 190. Further, the first horizontal portion 190 and the first vertical portion 192 forms an L-shaped structure similar to an L-shaped structure formed by the horizontal portion 142 and the vertical portion 144 of the cover 114. In some embodiments, an angle of inclination between the first horizontal portion 190 and the first vertical portion 192 may be greater than 90 degrees corresponding to a shape of the cover 114. The first arm 118 further includes a first pivot pin 194 having a top end 196 and a bottom end 198. In an assembled position of the first arm 118 with the central hinge 136, the top end 196 of the first pivot pin 194 is received within the first hole 186A of the top plate 170 and the bottom end 198 of the first pivot pin 194 is received within the first hole 188A of the bottom plate 178. A slot 200 is provided in the first horizontal portion 190 proximal to the top end 196 of the first pivot pin 194 to receive a portion of the top plate 170. Hence, a top surface of the top plate 170 and a top edge of the first horizontal portion 190 is aligned to define a planar bottom surface for the cavity 126. Hence, a bottom of the container 102 is placed on the planar bottom surface of the cavity 126.

The second arm 120 of the container holder 100 includes a second horizontal portion 206 and a second vertical portion 208 extending from the second horizontal portion 206. In one embodiment, the second vertical portion 208 is perpendicular to the second horizontal portion 206. Further, the second horizontal portion 206 and the second vertical portion 208 forms an L-shaped structure similar to the L-shaped structured of the cover 114 and the first arm 118. In some embodiments, an angle of inclination between the second horizontal portion 206 and the second vertical portion 208 may be greater than 90 degrees corresponding to the shape of the cover 114 and the first arm 118. The second arm 120 further includes a second pivot pin 210 having a top end 212 and a bottom end 214. In an assembled position of the second arm 120 with the central hinge 136, the top end 212 of the second pivot pin 210 is received within the second hole 186B of the top plate 170 and the bottom end 214 of the second pivot pin 210 is received within the second hole 188B of the bottom plate 178. A slot 216 is provided in the second horizontal portion 206 proximal to the top end 212 of the second pivot pin 210 to receive a portion of the top plate 170. Hence, the top surface of the top plate 170 and a top edge of the second horizontal portion 206 are aligned to define the planar bottom surface for the cavity 126.

Construction and structure of the third arm 122 and the fourth arm 124 are similar to the second arm 120 and the first arm 118, respectively. Hence, some of the constructional details of the third and fourth arms 122, 124 are not described in detail. The third arm 122 includes a third horizontal portion 220, a third vertical portion 222, and a third pivot pin 224 received within the third hole 186C of the top plate 170 and the third hole 188C of the bottom plate 178. Similarly, the fourth arm 124 includes a fourth horizontal portion 226, a fourth vertical portion 228, a fourth pivot pin 230 received within the fourth hole 186D of the top plate 170 and the fourth hole 188D of the bottom plate 178. In some embodiments, the first, second, third and fourth arms 118, 120, 122, 124 may be made from materials, such as metals or metal alloys including steel and aluminum, and polymers including, but not limited to, plastics and silicone rubber.

In the present embodiment, each of the top plate 170 and the bottom plate 178 has a circular cross section and each of the plurality of holes 186 and 188 is disposed around the central axis "X". Accordingly, the first pivot pin 194 and the second pivot pin 210 of the first arm 118 and the second arm 120, respectively, bend towards a first direction "D1" with respect to the first horizontal portion 190 and the second horizontal portion 206, respectively. Similarly, the third pivot pin 224 and the fourth pivot pin 230 of the third arm 122 and the fourth arm 124, respectively, bend towards a second direction "D2" with respect to the third horizontal portion 220 and the fourth horizontal portion 226, respectively. The second direction "D2" is opposite to the first direction "D1". In some embodiments, each of the top plate 170 and the bottom plate 178 may have one of a square cross section, a rectangular cross section, a triangular cross section, and a polygonal cross section. Accordingly, in one embodiment, the first arm 118 and the fourth arm 124 may be identical to each other. Similarly, the second arm 120 and the third arm 122 may be identical to each other. In another embodiment, the first arm 118, the second arm 120, the third arm 122 and the fourth arm 124 may be identical to each other.

The movement of the first arm 118, the second arm 120, the third arm 122, and the fourth arm 124 about the central hinge 136 to the open position may be enabled by the snapping member 172. More specifically, the transverse extension 176 restricts movement of the first arm 118 and the fourth arm 124 to predefined locations with respect to the cover 114. Further, an end of the transverse extension 176 is configured to engage with a slot 232 of each of the second arm 120 and the third arm 122 in the open position of the plurality of arms 116. Thus, the transverse extension 176 restricts movement of the second arm 120 and the third arm 122 to predefined locations from the first arm 118 and the second arm 120. In an example, an angular distance between two adjacent arms of the plurality of arms 116 may be 72 degrees. In various examples, an angular distance between two adjacent arms of the plurality of arms 116 may vary based on number of the arms and dimensional specifications of the cavity 126 to be defined by the container holder 100.

Figure 4:
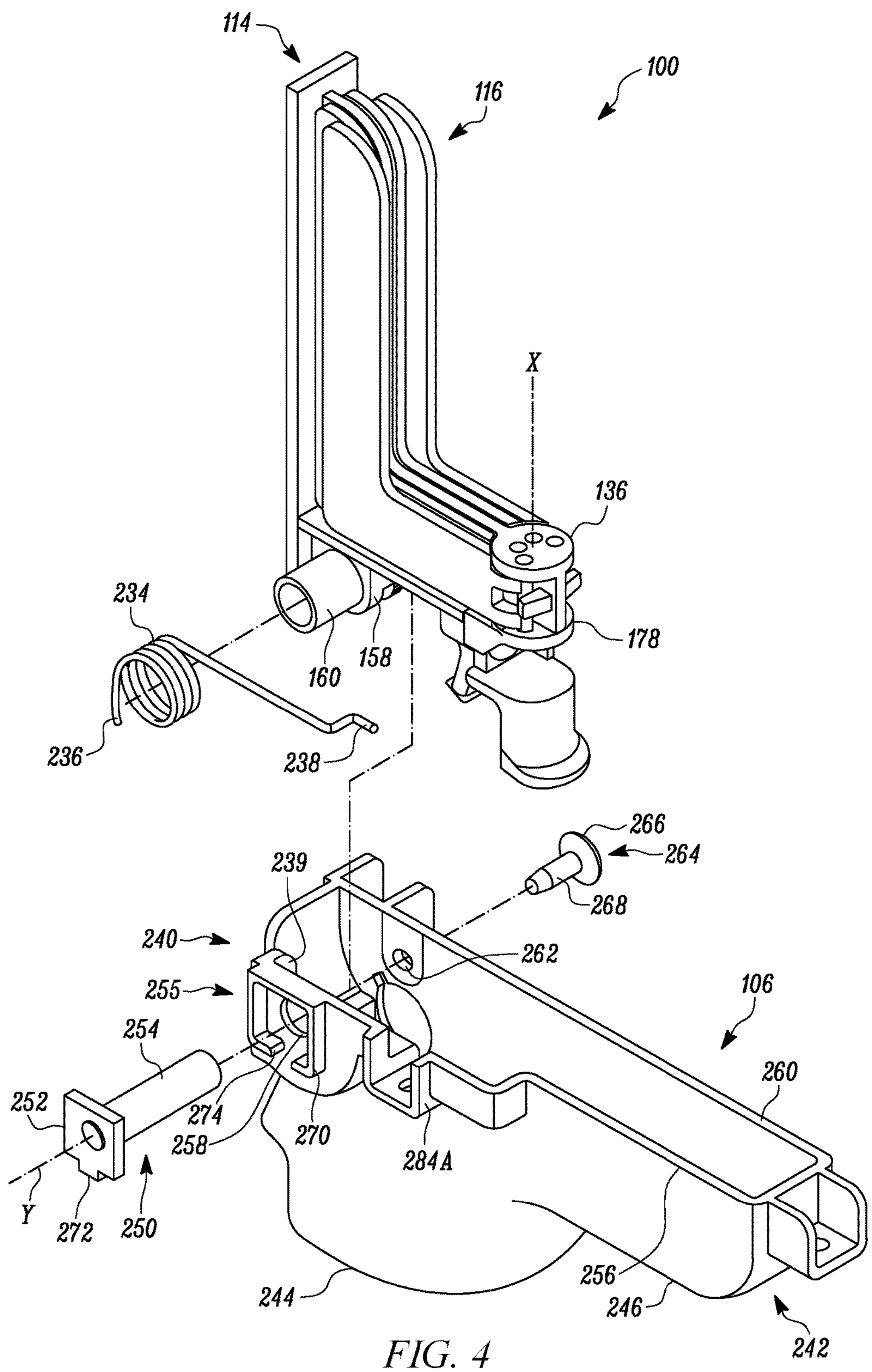
FIG. 4 is an exploded view showing coupling of the cover with a housing of the container holder.

Referring to FIG. 4, coupling of the cover 114 with the housing 106, according to an embodiment of the present disclosure, is illustrated. The container holder 100 includes a resilient member 234 disposed over the portion of the hollow shaft 160 extending from the first mounting portion 158. The resilient member 234 is configured to pivot the cover 114 from the retracted position to the raised position. In the present embodiment, the resilient member 234 is a torsional spring. The resilient member 234 includes a first end 236 configured to engage with the housing 106 and a second end 238 configured to engage with the bottom plate 178 of the central hinge 136. In various embodiments, the resilient member 234 may be one of a tensile spring and a compression spring, or may be made from an elastomeric material. In an assembled condition of the container holder 100, the first end 236 rests against a wall surface 239 of the housing 106 and the second end 238 rests against the bottom plate 178. In the retracted position, the cover 114 along with the plurality of arms 116 is disposed within the housing 106 against a biasing force of the resilient member 234.

The housing 106 is an elongate body having a rear end 240 and a front end 242. The housing 106 further includes an arcuate portion 244 proximal to the rear end 240 and an elongate portion 246 extending from the arcuate portion 244 towards the front end 242. The arcuate portion 244 and the elongate portion 246 are configured to receive the horizontal portion 142 and the vertical portion 144, respectively, of the cover 114 along with the plurality of arms 116 in the retracted position of the cover 114. The cover 114 is pivotally coupled to the housing 106 at the rear end 240 via an axle 250. The axle 250 includes a head 252 and a shank 254 extending from the head 252. The shank 254 is configured to receive through the hollow shaft 160 and supported on the housing 106 to pivotally couple the cover 114 with the housing 106. More specifically, the rear end 240 of the housing 106 includes a bulged portion 255 configured to receive the pivot member 154 including the first mounting portion 158, the hollow shaft 160, and the resilient member 234 disposed over the hollow shaft 160.

The housing 106 further includes a first side wall 256 having a first opening 258 and a second side wall 260 having a second opening 262, which is coaxial to the first opening 258. The first opening 258 is configured to receive the shank 254 of the axle 250 therethrough. The second opening 262 is configured to receive a fastening member 264. The fastening member 264 includes a head 266 and a shank 268 extending from the head 266. The shank 268 of the fastening member 264 is configured to couple with the shank 254 of the axle 250. In the illustrated embodiment, the fastening member 264 is threadably engaged with the shank 254 of the axle 250. In an assembly of the container holder 100, the hollow shaft 160 of the pivot member 154 is disposed coaxial to the first opening 258 and the second opening 262 of the first side wall 256 and the second side wall 260, respectively, of the housing 106. The shank 254 of the axle 250 is inserted through the first opening 258 of the first side wall 256 and the head 252 is supported in the first side wall 256. Similarly, the shank 268 of the fastening member 264 is inserted through the second opening 262 of the second side wall 260 and the head 266 is supported in the second side wall 260. Further, the shank 268 of the fastening member 264 is coupled with the shank 254 of the axle 250 for pivotally coupling the cover 114 with the housing 106. In some embodiments, a single fastening member may be inserted through the first opening 258 of the first side wall 256, the hollow shaft 160 of the pivot member 154, and the second opening 262 of the second side wall 260. Further, the single fastening member may be coupled to at least one of the first side wall 256 and the second side wall 260 for pivotally coupling the cover 114 with the housing 106.

The first side wall 256 further includes a recess defined by a projection wall 270 around the first opening 258 to receive the head 252 of the axle 250 therein. A height of the projection wall 270 is equal to a thickness of the head 252 of the axle 250. The head 252 of the axle 250 further includes a locking member 272 adapted to engage with a cutout 274 provided in the projection wall 270. In an assembled condition, the locking member 272 prevents rotary movement of the axle 250 such that the hollow shaft 160 of the pivot member 154 rotates about an axis "Y" to move the cover 114 from the retracted position to the raised position.

Figure 5:
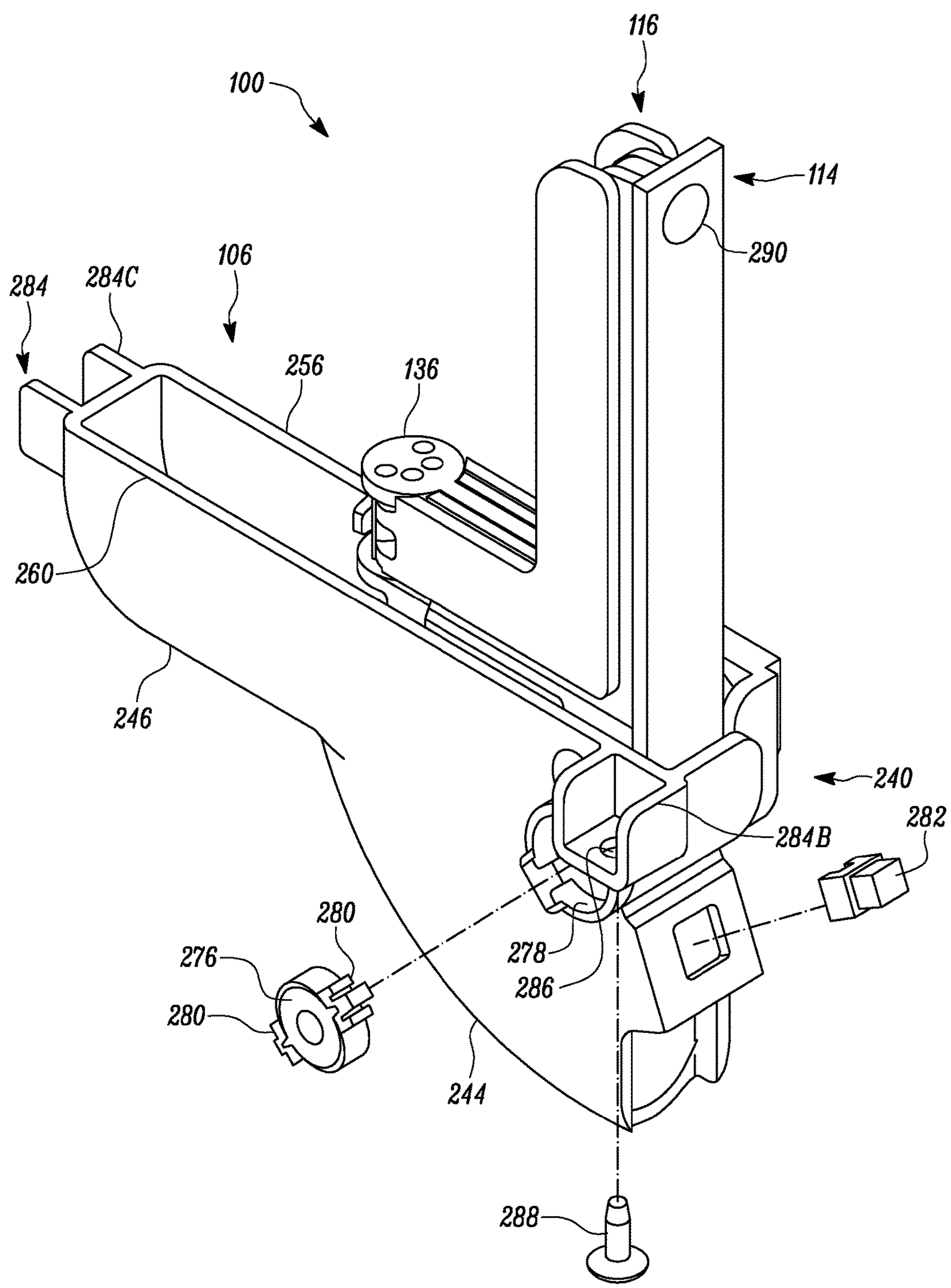
FIG. 5 is a rear perspective view of the container holder having the cover and the plurality of arms in a raised position.

Referring to FIG. 5, a perspective view showing the rear end 240 of the container holder 100, according to an embodiment of the present disclosure, is illustrated. The container holder 100 includes a rotary damper 276 coupled to the housing 106 and configured to drivably engage with the pivot member 154. The rotary damper 276 is configured to allow gradual movement of the cover 114 from the retracted position to the raised position. In one embodiment, the second side wall 260 of the housing 106 includes an opening 278 defined adjacent to the second opening 262. The rotary damper 276 is coupled with the opening 278 of the second side wall 260. Specifically, the rotary damper 276 includes a pair of mounting portions 280 for coupling the rotary damper 276 with the opening 278. In an embodiment, the rotary damper 276 may include a gear configured to drivably engage with a drive gear (not shown) of the pivot member 154. In one embodiment, the drive gear may be coupled to the hollow shaft 160. In another embodiment, the drive gear may be coupled to the first mounting portion 158 of the pivot member 154. The gear of the rotary damper 276 is in continuous contact with the drive gear of the pivot member 154. During movement of the cover 114 along with the plurality of arms 116 from the retracted position to the raised position, the rotary damper 276 may provide gradual movement of the cover 114 due to a known fluidic action within the rotary damper 276. In various embodiments, any type of known rotary damper may be coupled to the housing 106 to control movement of the cover 114 from the retracted position to the raised position.

The container holder 100 further includes a latching member 282 disposed at the rear end 240 of the housing 106 and configured to releasably couple with the cover 114 in the retracted position thereof. In the illustrated embodiment, the latching member 282 is a push-push latch. In the retracted position of the cover 114, the latching member 282 is configured to releasably engage with the extending portion 166 attached to the second mounting portion 162. In various embodiments, any other known latching member may be implemented to releasably engage the cover 114 in the retracted position thereof.

The housing 106 further includes a plurality of mounting portions 284 configured to couple to the console panel 104 of the motor vehicle. In the present embodiment, the plurality of mounting portions 284 includes a first mounting portion 284A (as shown in FIG. 4) defined on the first side wall 256, a second mounting portion 284B defined on the second side wall 260, and a third mounting portion 284C defined at the front end 242 of the housing 106. The second mounting portion 284B is discussed in detail herein below for illustration purpose of the present disclosure. The second mounting portion 284B includes a recessed portion having a hole 286 configured to receive a fastening member 288. The lower surface 110 of the console panel 104 includes an extended portion (not shown) having a hole received within the recessed portion. The hole of the extended portion is configured to receive the fastening member 288. During assembly, the extended portion of the console panel 104 is received within the recessed portion of the second mounting portion 284B of the housing 106 and the fastening member 288 is inserted through the holes of the recessed portion and the extended portion. The fastening member 288 is further tightened to couple the housing 106 of the container holder 100 with the console panel 104.

INDUSTRIAL APPLICABILITY

The present disclosure relates to the container holder 100 disposed in the console panel 104 of the motor vehicle for holding the container 102. The container holder 100 includes the housing 106 mounted on the console panel 104 and the cover 114 along with the plurality of arms 116 pivotally coupled to the housing 106. The cover 114 along with the plurality of arms 116 is moved between the retracted position and the raised position. Further, the plurality of arms 116 is moved from the closed position to the open position to define the cavity 126. As such, the container holder 100 is actuated to the raised position when the driver/operator has a need to hold the container 102 in the container holder 100. Otherwise, the container holder 100 is disposed below the upper surface 108 of the console panel 104 to allow for more space in the driver compartment or the operator cabin.

Figure 6:
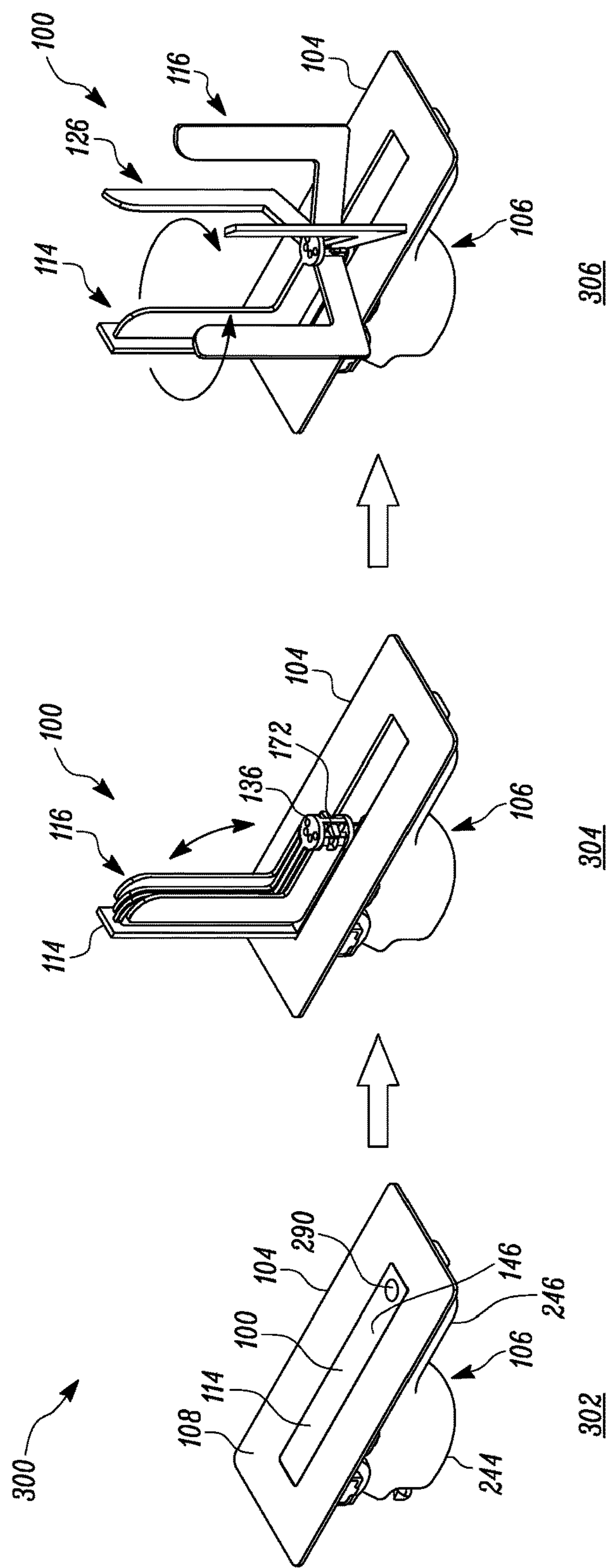
FIG. 6 is a perspective view of the container holder showing actuation thereof to define a cavity for receiving a container.

Referring to FIG. 6, a sequence of actuation of the container holder 100 disposed in the console panel 104 of the motor vehicle is illustrated. The retracted position of the cover 114 along with the plurality of arms 116 is shown at step 302. At the step 302, the cover 114 along with the plurality of arms 116 is received within the housing 106 such that a top surface of the cover plate 146 is aligned with the upper surface 108 of the console panel 104 and a space available on top of the console panel 104 is utilized for various purposes. The horizontal portion 142 of the cover 114 is received within the arcuate portion 244 of the housing 106 and the vertical portion 144 of the cover 114 is received within the elongate portion 246 of the housing 106. More specifically, the horizontal portion 142 of the cover 114 is disposed vertically at the rear end 240 of the housing 106. The rear end 240 of the housing 106 is provided with an opening such that a protruding member of the bottom plate 178 of the central hinge 136 protrudes outside the housing 106 through the opening. Further, the extending portion 166 of the second mounting portion 162 may be releasably engaged with the latching member 282 such that the cover 114 along with the plurality of arms 116 is retained within the housing 106 when the container holder 100 is not in use. Further, the cover 114 along with the plurality of arms 116 is retained within the housing 106 against the biasing force of the resilient member 234.

The raised position of the cover 114 and the closed position of the plurality of arms 116 are shown at step 304. At the step 304, the driver/passenger may apply the input, such as a downward force, at an end of the cover plate 146 defined proximal to the front end 242 of the housing 106. More specifically, the driver/passenger may apply the input at an indent 290 defined on the top surface of the cover plate 146. The indent 290 may represent a visual indication to the driver/operator to precisely apply the input proximal to the end of the cover plate 146. As a distance between the pivot member 154 and the indent 290 is more, an amount of the downward force applied by the driver/operator would be lesser. In an alternative embodiment, the cover 114 along with the plurality of arms 116 may be moved from the retracted position to the raised position by an actuation system, such as a mechanical system, an electronic system, a pneumatic system, a hydraulic system, and a combination thereof. Upon receipt of the input, the extending portion 166 is disengaged from the latching member 282 and the resilient member 234 causes movement of the cover 114 along with the plurality of arms 116 to the raised position due to the biasing force of the resilient member 234. The rotary damper 276, which is engaged with the pivot member 154, further causes gradual movement of the cover 114 along with the plurality of arms 116 from the retracted position to the raised position. In the raised position, the cover 114 and the plurality of arms 116 are disposed above the upper surface 108 of the console panel 104. More specifically, a clearance is defined between each of the plurality of arms 116 and the upper surface 108 of the console panel 104.

The open position of the plurality of arms 116 is shown at step 306. At the step 306, the driver/operator may apply an input, such as a manual force, to move each of the plurality of arms 116 from the closed position to the open position to define the cavity 126. More specifically, each of the first arm 118, the second arm 120, the third arm 122, and the fourth arm 124 is disposed equidistant from each other. The snapping member 172 of the central hinge 136 restricts and locks movement of each of the plurality of arms 116 such that each of the plurality of arms 116 is disposed at equal distance from each other to define the cavity 126. Further, the snapping member 172 restricts each of the plurality of arms 116 from accidentally or inadvertently collapsing partially or completely back to the closed position, thus reducing or preventing spills from the container 102 and/or inconvenience caused to the driver/passenger. Also, the snapping member 172 enhances stability of the container holder 100 in the open position. In various embodiments, each of the plurality of arms 116 may be moved from the closed position to the open position by an actuation system, such as a mechanical system, an electronic system, a pneumatic system, a hydraulic system, and a combination thereof. Upon forming the cavity 126, the container 102 may be disposed within the cavity 126. After use of the container holder 100, each of the plurality of arms 116 is moved to the closed position and the cover 114 along with the plurality of arms 116 is moved to the retracted position to make the space on top of the console panel 104 available for another use.

The container holder 100 of the present disclosure is easily used by the driver/passenger without the need for demonstrations or instructions, and may reduce or avoid issues such as spilling of hot beverages on or around the driver/passenger. Moreover, the container holder 100 may be easily operated by the user while the user is operating the motor vehicle or otherwise distracted. More particularly, the user may not need to look at the container holder 100, when actuating the container holder 100 to the open or closed positions, and can rely on, for example, tactile indicators to determine if the container holder 100 is completely closed or completely open and ready for use. This feature substantially enhances the convenience of the user as the user can continue to stay focused on tasks at hand, such as, operation of the motor vehicle.

The cover 114 and the plurality of arms 116 are designed to accommodate containers of various sizes and shapes generally known in the art. Particularly, the cover 114 and the plurality of arms 116 are designed to partly hold a bottom portion of the container 102, such that containers of various heights may be received within the cavity 126 of the container holder 100. Further, the resilient member 234, the latching member 282, and the rotary damper 276 are designed to enhance smooth actuation of the cover 114 along with the plurality of arms 116 from the retracted position to the raised position with minimum effort. Although the snapping member 172 facilitates disposition of each of the plurality of arms 106 at the angular offset about the central hinge 136, each of the plurality of arms 116 may be disposed at a distance less than the angular offset based on the size and shape of the container 102. The container holder 100 can be easily installed in new vehicles or be retrofitted in older vehicles. Hence, the container holder 100 may be made available as an aftermarket product. Further, the container holder 100 of the present disclosure has a simple design, which in turn, eases manufacturing of the various components of the container holder 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A container holder for a motor vehicle comprising:
- a housing for coupling to the motor vehicle;
- a cover pivotally coupled to the housing, the cover configured to pivot about a pivot axis that is fixed with respect to the housing from a retracted position to a raised position; and
- a plurality of arms coupled to the cover and connected at a central hinge, the plurality of arms configured to swivel about the central hinge from a closed position to an open position to define a cavity, the cavity configured to receive a container.

2. The container holder of claim 1, further comprising a snapping member configured to hold the plurality of arms approximately equidistant from each other to define the cavity.

3. The container holder of claim 1, wherein the cover is pivotally coupled to the housing via an axle.

4. The container holder of claim 3, further comprising a hollow shaft mounted on the cover and configured to receive the axle.

5. The container holder of claim 4, further comprising a resilient member disposed over the hollow shaft and configured to pivot the cover from the retracted position to the raised position.

6. The container holder of claim 5, wherein the resilient member is a torsional spring.

7. The container holder of claim 1, wherein the central hinge comprises:
- a top plate attached to the cover; and
- a bottom plate disposed below the top plate, and attached to the cover using a fastening member, the top plate and the bottom plate together configured to pivotally couple with the plurality of arms.

8. The container holder of claim 1, further comprising a rotary damper coupled to the housing, and configured to allow gradual movement of the cover from the retracted position to the raised position.

9. The container holder of claim 1, wherein each of the plurality of arms comprises a pivot pin configured to pivotally couple with the central hinge.

10. The container holder of claim 1, further comprising a latching member configured to releasably couple with the cover in the retracted position thereof.

11. The container holder of claim 10, wherein the latching member is a push-push latch.

12. The container holder of claim 1, wherein the housing comprises a plurality of mounting portions configured to couple with a console panel of the motor vehicle.

13. A container holder for a motor vehicle comprising:
- a cover having a cover plate for closing an opening in a console panel; and
- a plurality of arms coupled to the cover and connected at a central hinge, each of the plurality of arms configured to swivel about the central hinge about an axis that is substantially parallel to the cover plate from a closed position wherein the plurality of arms are positioned side by side, to an open position wherein the plurality of arms are positioned at an angular offset about the central hinge to define a cavity, the cavity configured to receive a container.

14. The container holder of claim 13, further comprising a housing coupled to the console panel of the motor vehicle, wherein the cover is pivotally coupled to the housing and configured to pivot from a retracted position wherein the cover and the plurality of arms are received within the housing below the console panel, to a raised position wherein the cover and the plurality of arms are disposed in an upright position above the console panel.

15. The container holder of claim 14, further comprising a resilient member disposed between the housing and the cover, and configured to pivot the cover from the retracted position to the raised position.

16. The container holder of claim 13, further comprising a snapping member coupled to the cover, the snapping member configured to hold each of the plurality of arms about the central hinge at the angular offset.

17. The container holder of claim 13, wherein the central hinge comprises:
- a top plate attached to the cover; and
- a bottom plate disposed below the top plate, and attached to the cover using a fastening member, the top plate and the bottom plate together configured to pivotally couple with the plurality of arms.

18. A container holder for a motor vehicle comprising:
- a housing for coupling to a console panel of the motor vehicle;
- an L-shaped cover pivotally coupled to the housing, the L-shaped cover configured to pivot from a retracted position to a raised position; and
- a plurality of L-shaped arms coupled to the L-shaped cover and connected at a central hinge, the plurality of L-shaped arms configured to swivel about the central hinge from a closed position to an open position to define a cavity, the cavity configured to receive a container.

19. The container holder of claim 18, further comprising a snapping member configured to hold the plurality of L-shaped arms approximately equidistant from each other to define the cavity.

20. The container holder of claim 18, further comprising a resilient member disposed between the housing and the cover, and configured to pivot the cover from the retracted position to the raised position.

* * * * *